(12) United States Patent
Nagasaku

(10) Patent No.: US 6,741,205 B2
(45) Date of Patent: May 25, 2004

(54) MONOPULSE RADAR SYSTEM

(75) Inventor: Toshiyuki Nagasaku, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/227,306

(22) Filed: Aug. 26, 2002

(65) Prior Publication Data
US 2003/0160718 A1 Aug. 28, 2003

(30) Foreign Application Priority Data

Feb. 27, 2002 (JP) ........................................ 2002-050864

(51) Int. Cl.$^7$ .............................. G01S 7/40; G01S 13/44
(52) U.S. Cl. .................... 342/174; 342/149; 342/153; 342/165; 342/173; 342/195
(58) Field of Search ................ 342/27, 28, 73, 342/74–81, 147–158, 165–175, 192–197, 427, 59, 67

(56) References Cited

U.S. PATENT DOCUMENTS

| | | | | |
|---|---|---|---|---|
| 4,319,242 A | * | 3/1982 | Lewis | 342/67 |
| 4,347,513 A | * | 8/1982 | Schindler | 342/59 |
| 4,719,465 A | * | 1/1988 | Kuroda | 342/151 |
| 5,315,304 A | * | 5/1994 | Ghaleb et al. | 342/165 |
| 6,144,333 A | * | 11/2000 | Cho | 342/149 |

FOREIGN PATENT DOCUMENTS

| | | | | |
|---|---|---|---|---|
| EP | 0110260 A1 | * | 6/1984 | G01S/7/28 |
| GB | 2166618 A | * | 5/1986 | G01S/3/32 |
| GB | 2259778 A | * | 3/1993 | G01R/29/08 |
| JP | 5-232215 A | | 2/1992 | |
| JP | 11-271433 A | | 3/1998 | |

OTHER PUBLICATIONS

G. Jacovitti et al., "Self–Calibrating SSR Monopulse Receiver"; IEEE Trans. on Aerospace and Electronic Systems, vol. 28, Issue 4; Oct. 1992; pp. 944–949.*

S. Paglial et al., "Error Modeling and Calibration Procedure for a Full–Angle Monopulse Receiver"; Proceedings of the Radar '92 International Conference; Oct. 12–13, 1992; pp. 210–213.*

R. Liebenberg et al., "Phase Calibration Considerations in a Monopulse Doppler Radar"; Proceedings of the Fourth IEEE AFRICON Conference; vol. 2; Sep. 1996; pp. 909–912.*

R. Rotman et al., "Calibration of Large Phased Arrays Including Monopulse Ratios"; 2001 International Symposium of the IEEE Antennas and Propagation Society; vol. 1; 2001; pp. 622–625.*

* cited by examiner

Primary Examiner—Bernarr E. Gregory
(74) Attorney, Agent, or Firm—Reed Smith, LLP; Stanley P. Fisher, Esq.; Juan Carlos A. Marquez, Esq.

(57) ABSTRACT

A monopulse radar system aims to correct an amplitude error and a phase error developed between receiving channels and improve the accuracy of a detected angle. To achieve the above aim, part of a transmit signal is supplied to respective channels on the receiving side through a signal transmission line for calibration. At this time, the gains of a variable phase shifter and a variable gain amplifier are adjusted so that an azimuth angle of a pseudo target, based on a signal for calibration, which is calculated by signal processing means, reaches a predetermined angle. Therefore, calibration work is simplified and an angular correction can be automated. Therefore, the present monopulse radar system is capable of coping even with variations in characteristic after product shipment due to environmental variations and time variations in parts characteristic.

20 Claims, 12 Drawing Sheets

MONOPULSE RADAR SYSTEM

BACKGROUND OF THE INVENTION

1. Field of the Invention

The present invention relates to a monopulse radar system, and more specifically to a monopulse radar system for radiating a signal from a transmitting antenna, and receiving a signal reflected by a target with a plurality of receiving antennas to thereby detect an angle of an existing position of the target.

2. Description of the Related Art

In a radar system, a monopulse system is known as one method of detecting an azimuth angle to a target. The monopulse system radiates a signal from a transmitting antenna and receives a signal reflected by a target through the use of two or more receiving antennas. At this time, information about the angle of the target to the radar system is obtained from the difference in amplitude or phase between the signals received by the individual antennas. In general, one using the phase difference is called a "phase monopulse", whereas one using the amplitude difference is called an "amplitude monopulse". As this type of monopulse radar system, a radar system using a phase monopulse has been described in, for example, Japanese Patent Laid-Open No. H11 (1999)-271433.

The principle of operation of a monopulse radar system will be explained below using FIG. 2. A signal generated from a signal generator OSC1 is radiated or emitted from a transmitting antenna ANT1. The radiated signal is reflected by a target, which in turn is received by two receiving antennas ANT2 and ANT3. The received signals are converted into low frequency signals by mixers MIX1 and MIX2, followed by being subjected to signal analytic processing such as FFT (Fast Fourier Transform) in signal processing means P1.

In the case of the phase monopulse, the difference in phase between signals received by two antennas is determined. When the two receiving antennas are laid out with an interval d defined therebetween as shown in FIG. 3, the following equation (1) is established between the difference in phase between signals received by them, and an azimuth angle to a target:

$$\Delta\phi = (2\pi d/\lambda)\sin\theta \tag{1}$$

On the other hand, when the amplitude monopulse is used, directivity S1 of the receiving antenna ANT2 and directivity S2 of the receiving antenna ANT3 are distributed as represented in a gain characteristic of FIG. 4. A signal strength based on the sum of the signals received by the two antennas and a signal strength based on the difference between the signals are respectively represented as gain characteristics shown in FIG. 5. Further determining the ratio between the two from the sum signal and the difference signal results in a gain characteristic R1 of FIG. 6. The magnitude of this ratio and angles are associated with each other to thereby determine each corresponding angle.

An in-vehicle radar system often makes use of an ultra-high frequency like a millimeter wave. Frequencies ranging from 76 GHz to 77 GHz are assigned to a vehicle radar used in a vehicle-to-vehicle distance warning system for a vehicle. In general, parts used in such an ultra-high frequency are expensive and large in part-to-parts characteristic variations as compared with parts used in a low frequency. Further, since the wave length is very short in the ultra-high frequency like the millimeter wave, variations in characteristic occur even upon assembly of modules for the radar system.

On the other hand, the conventional monopulse radar system shown in FIG. 2 detects a phase difference or an amplitude difference from the low-frequency signals produced by the mixers MIX1 and MIX2 and calculates the azimuth angle of the target, based on it. Thus, it is necessary to grasp whether a channel CH1 based on the receiving antenna ANT2 and a channel CH2 based on the receiving antenna ANT3 coincide in characteristic with each other with very high accuracy, or the difference therebetween in advance.

In the radar system using signals lying in a millimeter wave band, however, a phase error or an amplitude error is developed between channels due to the aforementioned reason, and an error is developed in a detected azimuth angle of target.

As a countermeasure taken against it, a method of detecting and selecting used parts in advance and using only ones matched in characteristic with each other might be adopted. However, this will result in an increase in part cost. Further, variations developed upon part assembly cannot be eliminated.

As another countermeasure, there is known a method of actually radiating a radio wave from the forward of a radar system and correcting a phase difference or an amplitude error developed between channels, based on a detected signal obtained therefrom as has been described in, for example, Japanese Patent Laid-Open No. H5 (1993)-232215. In such a method, however, the system becomes large-scale and takes a lot of trouble over its calibration work. Therefore, the manufacturing cost thereof will increase due to the new addition of this work.

A problem arises in that any countermeasures referred to above do not take into consideration variations in characteristic after the shipment of each product, and the accuracy of a detected angle is deteriorated where variations in characteristic occur due to some kind of factors such as environmental variations, time variations in parts characteristic.

Accordingly, it is a main object of the present invention to provide a monopulse radar system capable of easily correcting a phase error or an amplitude error developed between receiving channels corresponding to a plurality of receiving antennas of the monopulse radar system and reducing a manufacturing cost thereof.

It is another object of the present invention to provide a monopulse radar system capable of coping even with characteristic variations after product shipment such as environmental variations, time variations in parts characteristic and correcting a phase error and an amplitude error.

BRIEF SUMMARY OF THE INVENTION

In order to achieve the above object, a monopulse radar system of the present invention is provided with a calibration signal transmission line for supplying part of a transmit signal to each of respective receiving antennas or each of signal transmission lines (i.e., each of individual output parts of a plurality of receiving antennas) connected to the receiving antennas as a signal for calibration. The monopulse radar system is also provided with correcting means for calculating an azimuth angle of a pseudo target based on the calibration signal, determining an azimuth angle to be originally calculated by a monopulse radar, using the azimuth angle of the pseudo target, and adjusting at least either amplitude or phase so that the azimuth angle to be originally calculated and the azimuth angle of the pseudo target calculated precedently by each calibration signal coincide with each other.

In a preferred embodiment of the present invention, the signals for calibration respectively applied to the output parts of the plurality of receiving antennas are set as being equipower and equiphase. Particularly when directivities of the two receiving antennas are made symmetrically with respect to a central direction, such a state that the signals are inputted to the respective antennas at equal power and in equiphase fashion in this way, occurs when a target is placed on a center line indicative of the center of an angle to be detected by a radar. Thus, a correcting process is performed in such a manner that the azimuth angle of the pseudo target, which is calculated from the signals for calibration, extends on the center line of the radar.

The signal for calibration is used where the signal is always supplied to the output parts of the plurality of receiving antennas, and where a switch is provided on a calibration signal transmission line for supplying the signal calibration and a switch driving unit for controlling conducting and cut-off states of the switch is provided. As the control on the conducting and cut-off states, there are one for normally bringing the calibration signal transmission line to the cut-off state and bringing it to the conducting state upon calibration, and one for generating the conducting state of the switch periodically or with predetermined timing. In particular, a signal processing device such as a DSP is used to perform either one of the above-described calibrations automatically or with arbitrary timing, thereby correcting variations in characteristic developed after product shipment due to environmental variations, time variations in parts characteristic, etc. In the present embodiment, the accuracy of the angle detected by the monopulse radar can be maintained by ever-execution of the calibration.

The correcting means of the monopulse radar according to the present invention comprises signal processing means for calculating an azimuth angle of a pseudo target, based on the signal for calibration, determining an azimuth angle to be originally calculated by the monopulse radar through the use of the azimuth angle of the pseudo target, determining correction data so that the azimuth angle to be originally calculated and the azimuth angle of the pseudo target, which is precedently detected by the signal for calibration, coincide with each other, writing the correction data into memory means, and correcting an azimuth angle of a target detected when actually activated as a radar, according to signal processing on the basis of the correction data stored in the memory means.

As another preferred embodiment, the signal for calibration is modulated with a low frequency signal. Thus, the calibration signal is superimposed on a reflected signal, thus causing inconvenience. Namely, if the operation of an antenna is not perfectly stopped upon calibration, then a signal radiated from a transmitting antenna is reflected by an object present ahead of the antenna, which is then received by its corresponding receiving antenna depending on environments under which calibration is made. The present embodiment prevents such inconvenience that when a transmit signal is used as a signal for calibration as it is, this signal is superimposed on the calibration signal, so that accurate calibration cannot be performed. The present embodiment is also effective in preventing a low frequency signal converted by a mixer from being brought into a DC current in a homodyne type radar wherein the same ones are used for a local signal generator for generating a transmit signal and a signal generator for generating a local signal supplied to the mixer.

BRIEF DESCRIPTION OF SEVERAL VIEWS OF DRAWING

DETAILED DESCRIPTION OF THE INVENTION

Preferred embodiments of the present invention will hereinafter be described with reference to the accompanying drawings.

Figure 1:
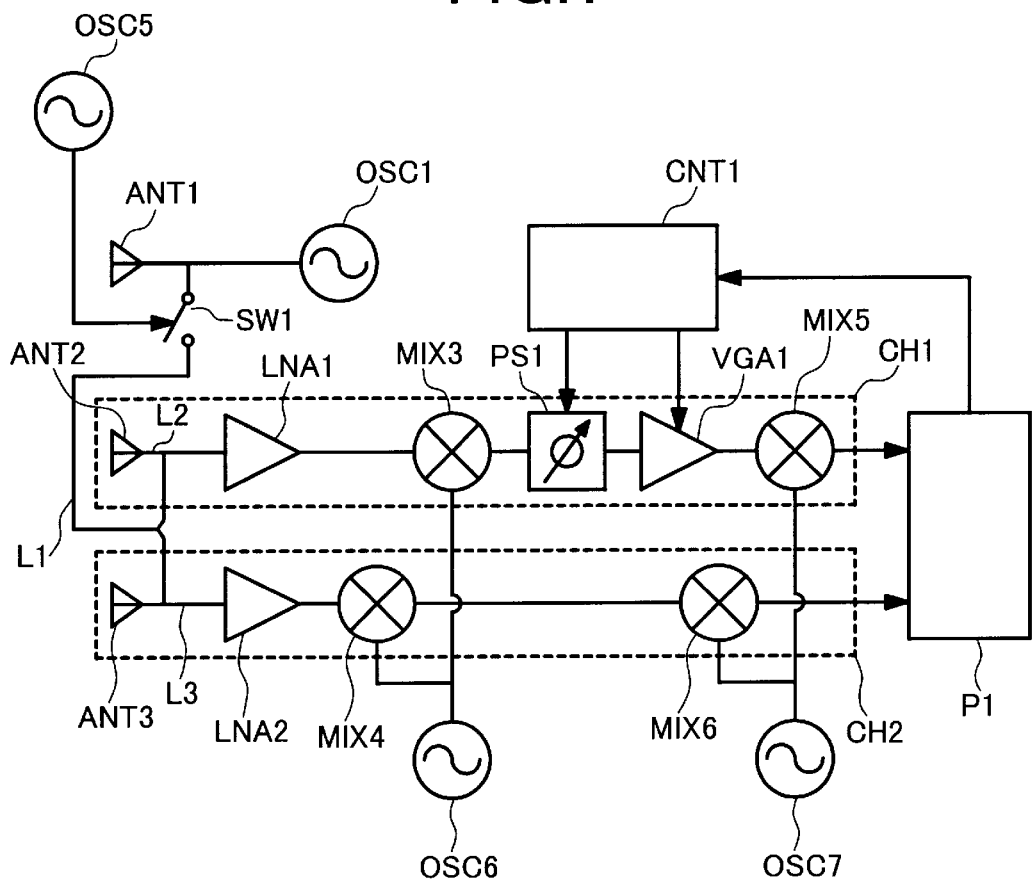
FIG. 1 is a block diagram showing a configuration of a first embodiment of a monopulse radar system according to the present invention.
Figure 2:
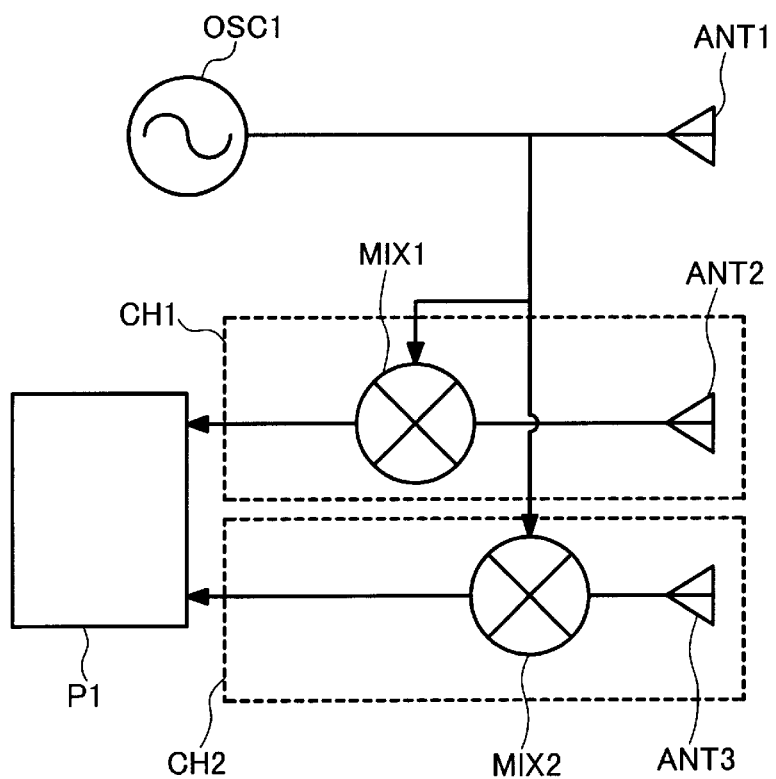
FIG. 2 is a block diagram illustrating a configuration of a conventional monopulse radar system.
Figure 3:
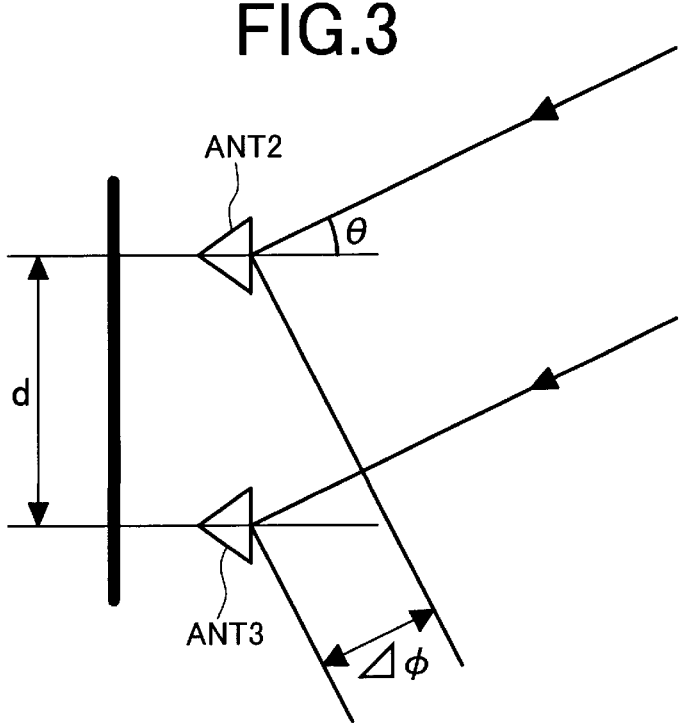
FIG. 3 is a diagram for describing the principle of a phase monopulse radar.

FIG. 1 is a block diagram showing a configuration of a first embodiment of a monopulse radar system according to the present invention. The present embodiment is a monopulse radar system which has a transmitting antenna ANT1, and two receiving antennas ANT2 and ANT3 and which radiates or emits a transmit signal from the transmitting antenna ANT1, receives a signal obtained by allowing the transmit signal to be reflected by a target, with the receiving antennas ANT2 and ANT3, and detects an azimuth angle of its target according to signal processing. The monopulse radar system includes a signal transmission line L1 for calibration connected from an oscillator OSC1 to the transmitting antenna ANT1, from which part of the transmit signal is supplied to each of signal transmission lines L2 and L3 connected to the receiving antennas ANT2 and ANT3 as a signal for calibration, and a switch SW1 for bringing the signal transmission line L1 into conduction or a cut off state. Further, a channel CH1 for processing the signal received by one antenna ANT2 is provided with phase correcting means PS1 and amplitude correcting means VGA1.

The switch SW1 is brought to a conducting state and at least one of the phase correcting means PS1 comprised of a variable phase shifter and the amplitude correcting means VAG1 comprised of a variable gain amplifier is adjusted so that an azimuth angle of a pseudo target, which is detected according to the signal for calibration, reaches a predetermined angle of a monopulse radar to thereby carry out an angle correction.

Described more specifically, when the switch SW1 is brought into conduction, some of the transmit signal are supplied to the two receiving channels CH1 and CH2 via the signal transmission line L1 at equal power and in equiphase fashion. At this time, the switch SW1 is switched or changed over by a low frequency signal source OSC5 so that the signal for calibration is modulated with a low frequency. This signal is amplified by low noise amplifiers LNA1 and LNA2 for the respective channels CH1 and CH2. Thereafter, the amplified signals are mixed with a signal produced from an oscillator OSC6 by mixers MIX3 and MIX4 respectively, so that they are converted into signals each having an intermediate frequency. The signal having the intermediate frequency is allowed to pass through the variable phase shifter PS1 and the variable gain amplifier VGA1 in one channel CH1 and then mixed with a signal oscillated from an oscillator OSC7 by use of a mixer MIX5, where it is converted into a low frequency signal. In the other channel CH2, the signal outputted from the mixer MIX4 is directly inputted to a mixer MIX6, where it is converted into a low frequency signal in a manner similar to above. These signals are processed by signal processing means P1.

Figure 4:
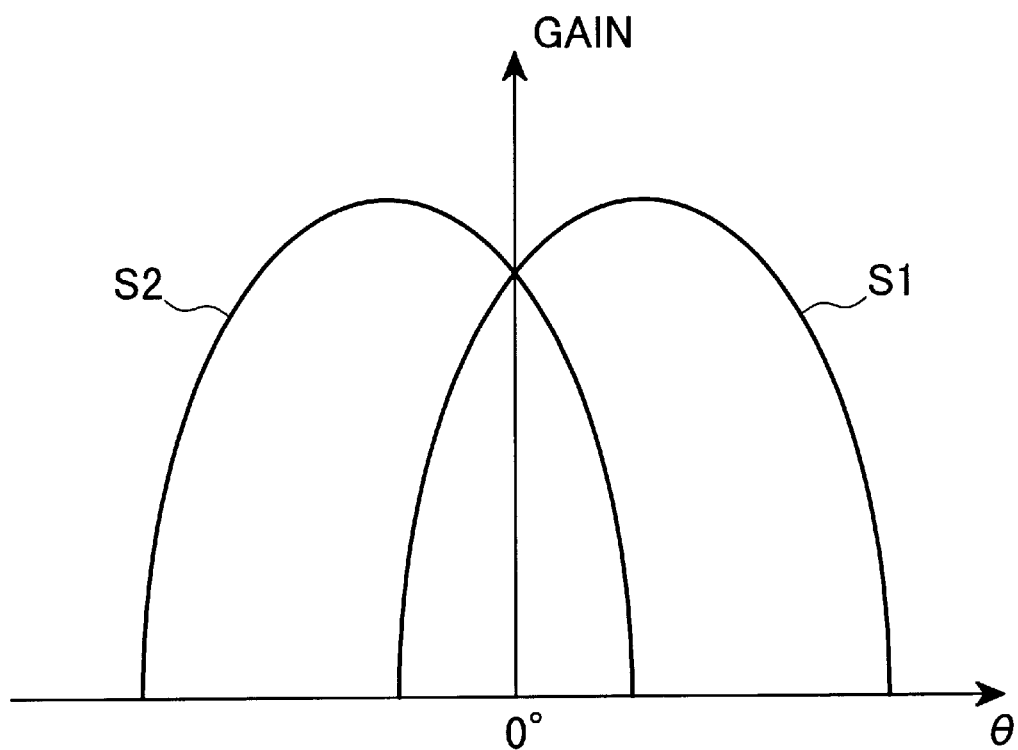
FIG. 4 is a characteristic diagram illustrating signals received by amplitude monopulse antennas.
Figure 5:
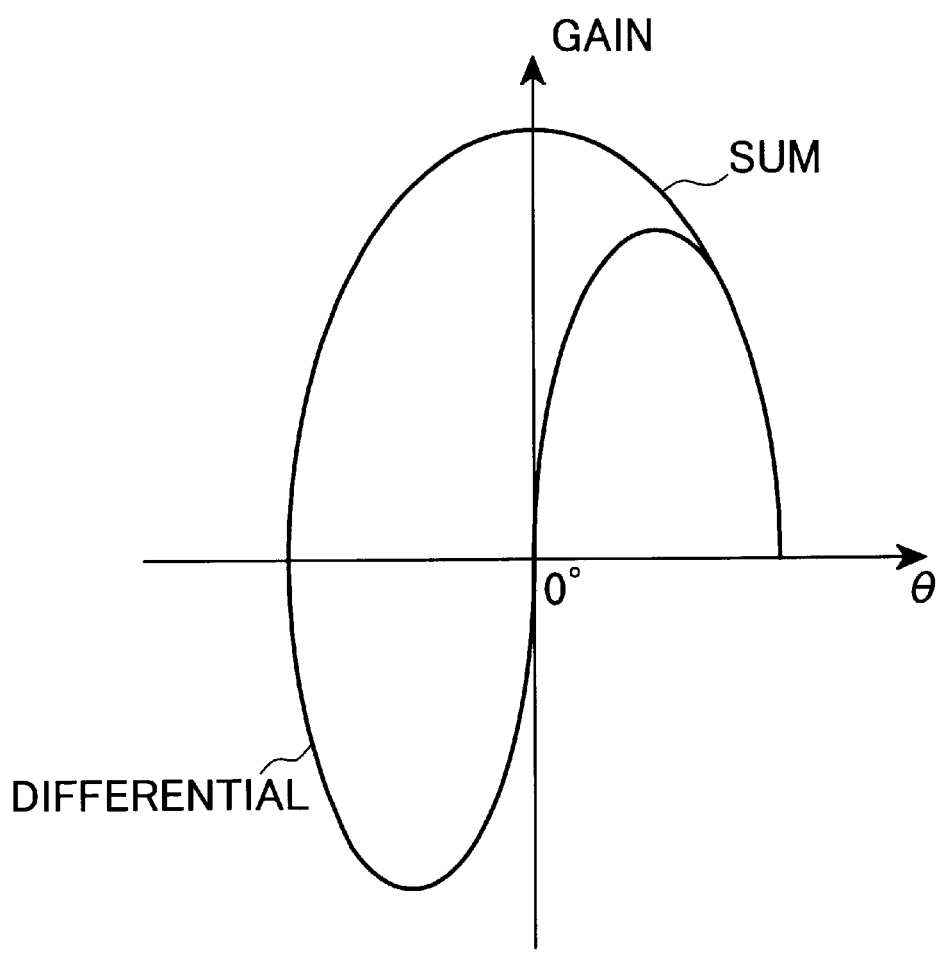
FIG. 5 is a gain characteristic diagram showing a sum signal and a differential signal received by the amplitude monopulse antennas.
Figure 6:
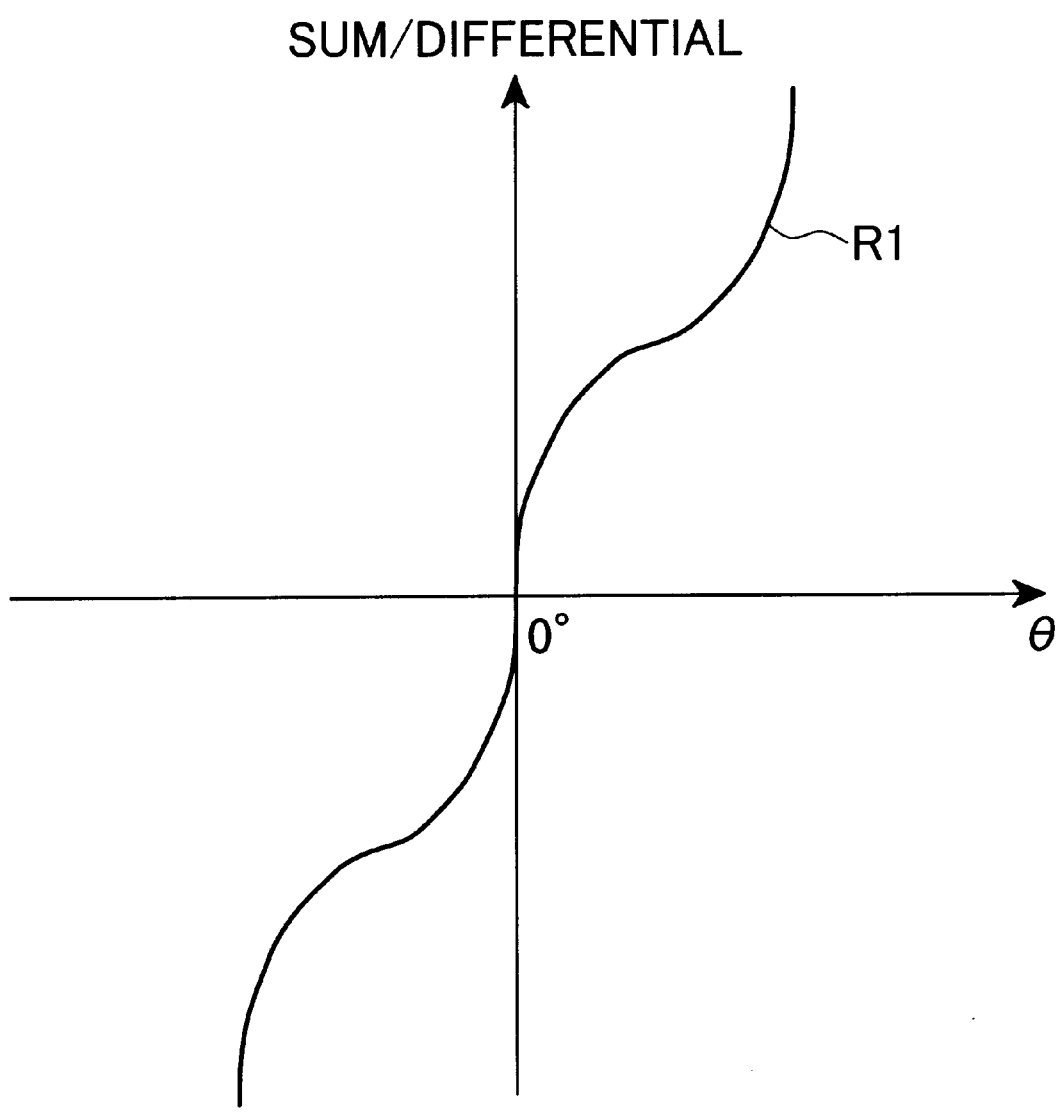
FIG. 6 is a characteristic diagram illustrating a ratio between the sum signal and the differential signal received by the amplitude monopulse antennas.

Directivities of the receiving antennas ANT2 and ANT3 are respectively formed symmetrically about the center line corresponding to an angle 0° as in the case of the characteristic curves S1 and S2 shown in FIG. 4.

Figure 7:
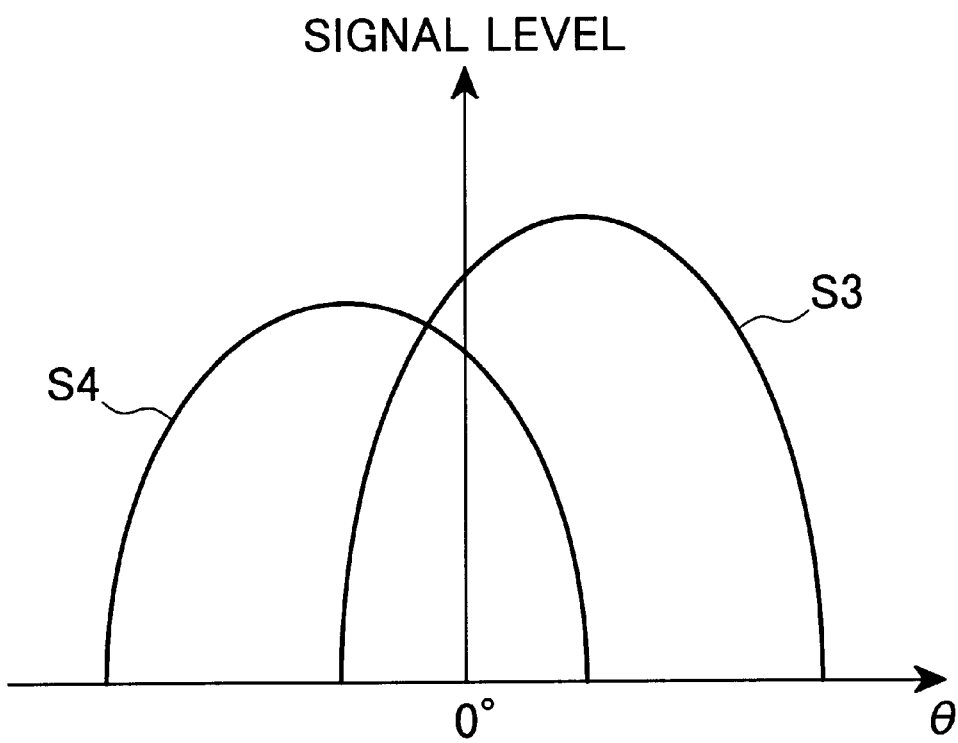
FIG. 7 is a signal strength characteristic diagram of receive signals where an error arises between channels for the amplitude monopulse antennas.
Figure 8:
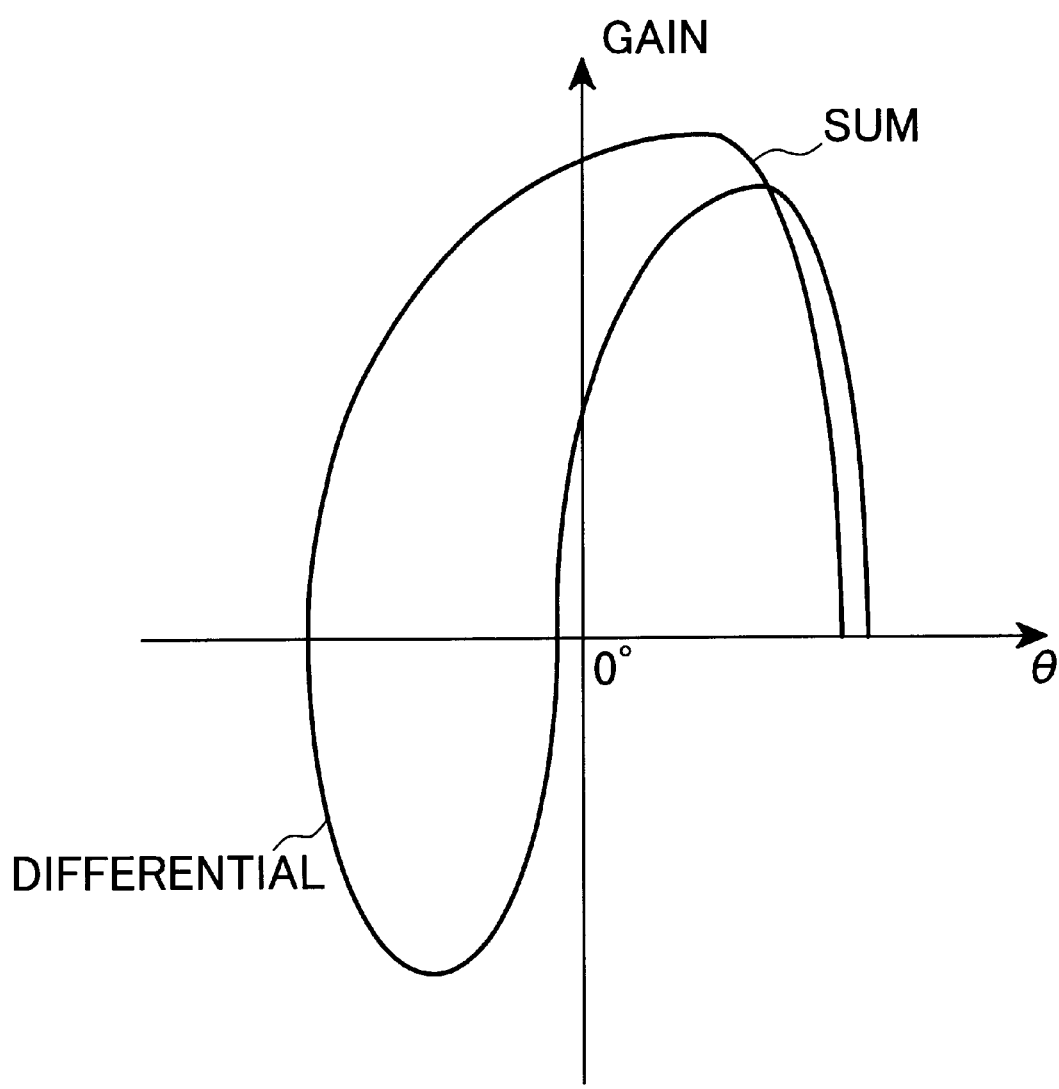
FIG. 8 is a gain characteristic diagram showing a sum signal and a differential signal where the error arises between the channels for the amplitude monopulse antennas.
Figure 9:
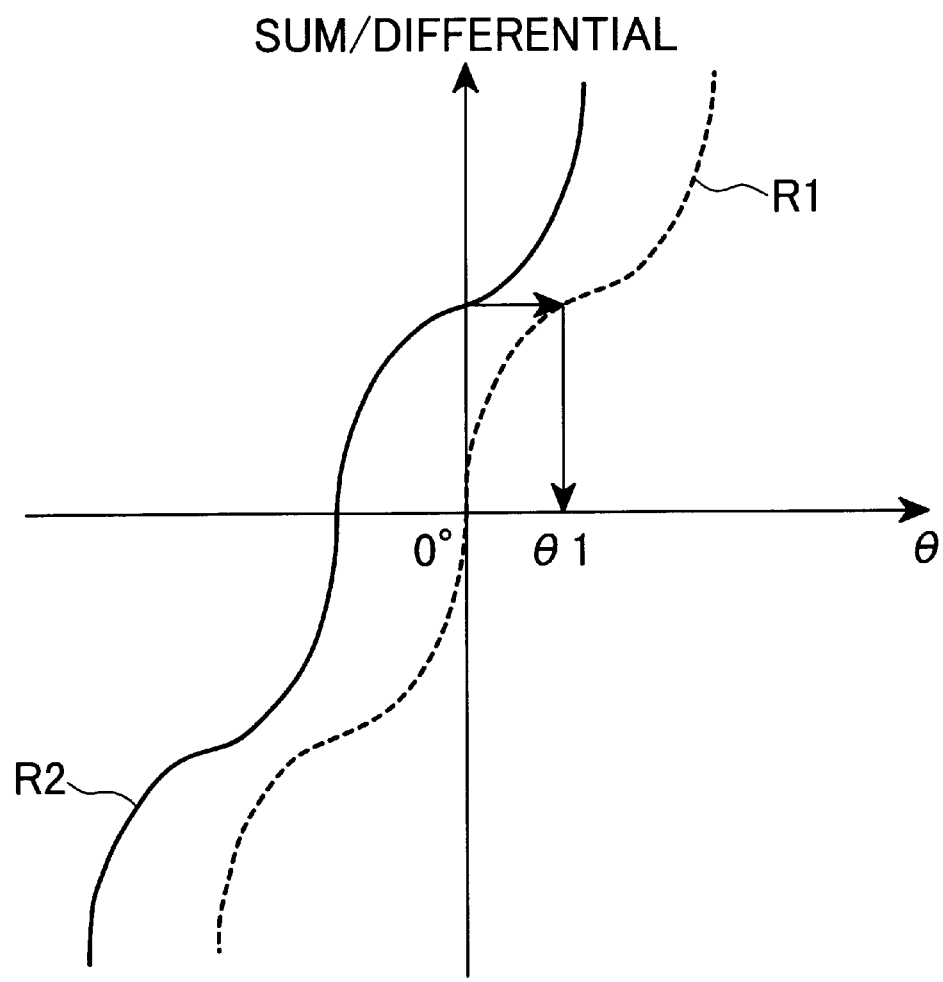
FIG. 9 is a characteristic diagram illustrating a ratio between a sum signal and a differential signal where the error occurs between the channels for the amplitude monopulse antennas.

When the respective channels CH1 and CH2 are not coincident in characteristic with each other immediately after the start of calibration processing, the strengths of the low frequency signals outputted from the mixers MIX5 and MIX6 do not coincide with each other even if the input signals are equal in strength and phase. This is represented as shown in a characteristic diagram of FIG. 7 by way of example. Namely, when a signal strength S3 of the one channel CH1 is greater than a signal strength S4 of the other channel CH2 as illustrated in the characteristic diagram of FIG. 7, a signal corresponding to the sum of the two signals and a signal corresponding to the difference between the two signals are represented as a characteristic diagram shown in FIG. 8. Further, the ratio between the sum signal and the differential signal is represented as a characteristic R2 shown in FIG. 9.

Since the monopulse radar calculates an angle with a ratio R1 at the time that the characteristics of both channels are equal, as the base, it consequently outputs an angle θ1 other than 0° as the azimuth angle of the pseudo object detected by the signal for calibration. In order to allow the angle θ1 to reach 0°, control signal generating means CNT1 generates a control signal so that the gain of the variable gain amplifier VGA1 is lowered. Finally, the strengths of the low frequency signals outputted from both channels become equal to each other and thereby result in the same form as FIG. 4.

According to the present embodiment, since the angle correction of the monopulse radar system is automatically performed on a circuitry basis without human hands, the cost necessary for calibration work.

Figure 10:
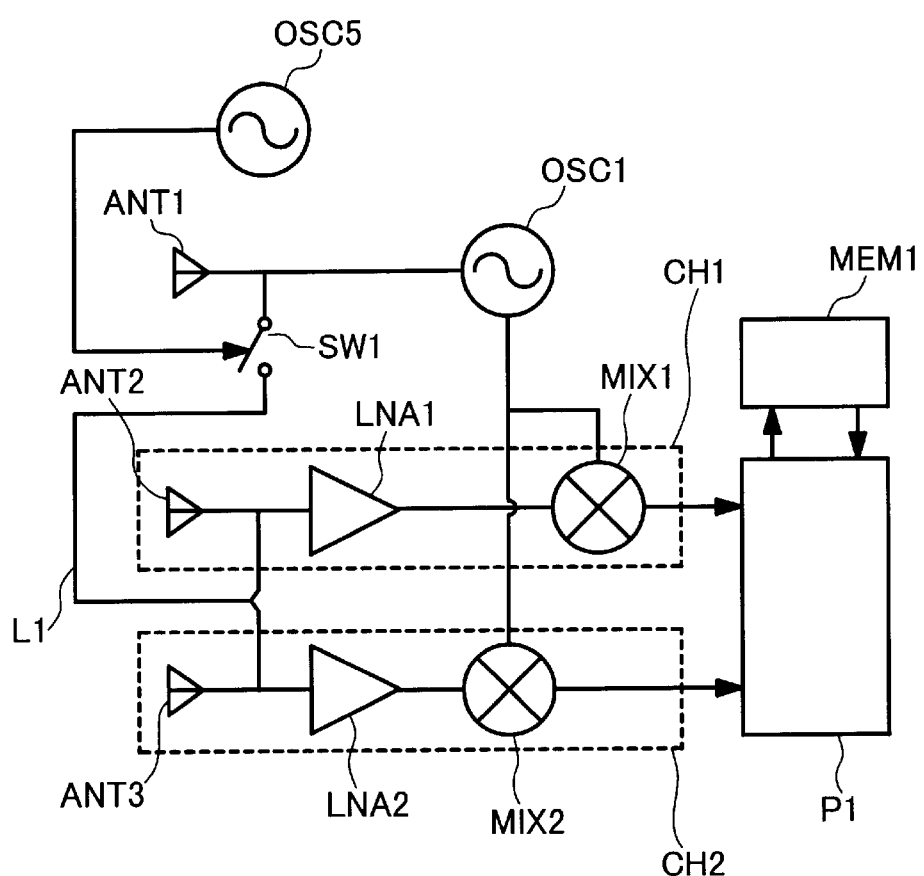
FIG. 10 is a block diagram showing a configuration of another embodiment of a monopulse radar system according to the present invention.

FIG. 10 is a block diagram showing a configuration of another embodiment of a monopulse radar system according to the present invention. The present embodiment is an embodiment used in a vehicle radar using signals lying in a 77 GHz band. Receive characteristics of receiving antennas ANT2 and ANT3 respectively have the receive patterns S1 and S2 symmetric about the center line as shown in FIG. 4. A common signal generator OSC1 is used for a signal generator for generating a transmit signal and signal generators for generating local signals inputted to mixers MIX1 and MIX2.

In the present embodiment, a signal for calibration supplied to both channels CH1 and CH2 on the receiving side via a signal transmission line L1 for calibration, passes through each of low noise amplifiers LNA1 and LNA2, after which they are converted into low frequency signals by mixers MIX1 and MIX2. The low frequency signals are signal-analyzed by signal processing means P1, so that a pseudo target based on the signal for calibration is detected. Correction data is determined so that an azimuth angle to the pseudo target at this time reaches 0°, which in turn is stored in memory means MEM1. When the monopulse radar system is normally operated as a vehicle-to-vehicle distance warning system, a switch SW1 is in a cutoff state, and the azimuth of a forward traveling vehicle, which is detected at this time, is corrected based on the correction data stored in the memory means MEM1.

Figure 11:
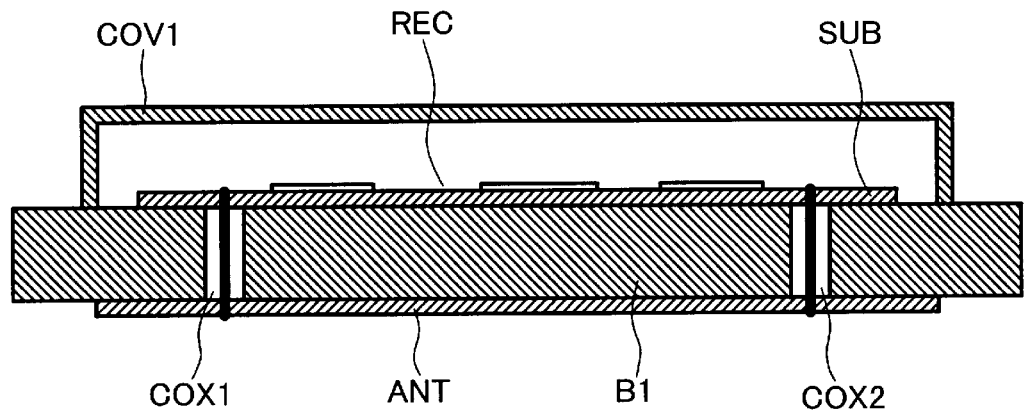
FIG. 11 is a side cross-sectional view of one embodiment of an in-vehicle radar module which constitutes a monopulse radar system according to the present invention.
Figure 12:
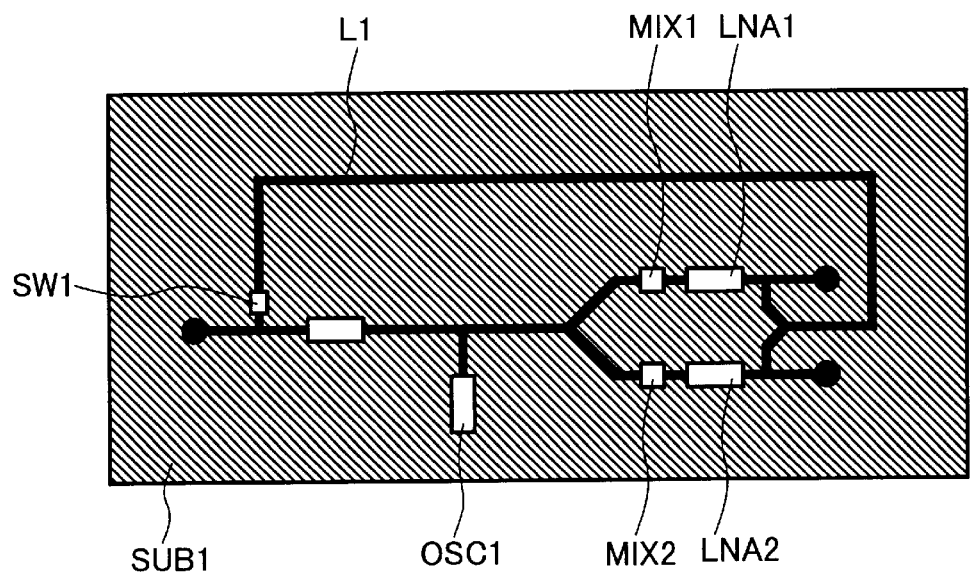
FIG. 12 is a plan view of an RF circuit shown in FIG. 11.

FIG. 11 is a side cross-sectional view of one embodiment of an in-vehicle radar module which constitutes a monopulse radar system according to the present invention. The in-vehicle radar module includes an RF circuit RFC and a plane antenna ANT provided on the observe and reverse sides of a base plate B1. Both of the RF circuit RFC and the plane antenna ANT are connected to each other by coaxial transmission lines COX1 and COX2. The RF circuit RFC is covered with a cover COV1 to keep hermeticity. The RF circuit RFC takes such a configuration as shown in a plan view of FIG. 12. An MMIC (Monolithic Microwave Integrated Circuit) comprising a signal oscillator OSC1, mixers MIX1 and MIX2, low noise amplifiers LAN1 and LNA2, a switch SW1, etc. is packaged or mounted on a high-frequency substrate SUB1. Although not illustrated in the drawing, a low frequency signal for switching the switch with a low frequency is supplied from a low frequency signal generator provided outside the module.

According to the present embodiment, since corrections are performed according to digital signal processing, the present module is suitable for automatically carrying out these by a signal processing device such as a microcomputer. Signal calibration may be carried out with specific timing when, for example, the power for the radar module is turned on. Further, the corrections can be automatically performed even after shipment of a product. Thus, a vehicle radar corresponding even to environmental variations, time variations in parts characteristic, etc. can be fabricated.

Figure 13:
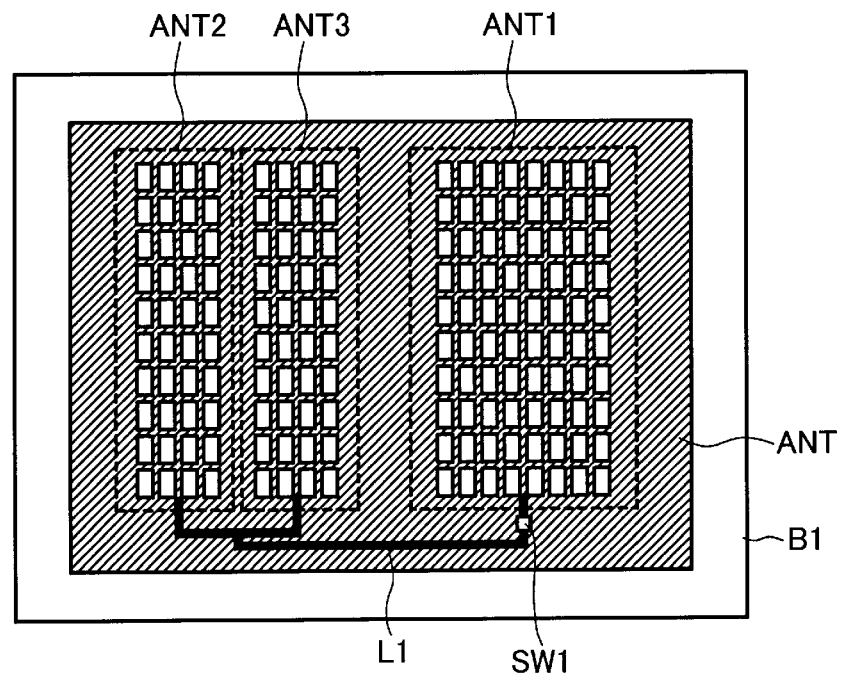
FIG. 13 is a plan view of an antenna section of another embodiment of the in-vehicle radar module which constitutes the monopulse radar system according to the present invention.

FIG. 13 is a plan view of one embodiment of part formed with the antennas referred to above. The present embodiment is an embodiment wherein a signal transmission line L1 for calibration is provided on the same substrate B1 as plane patch antennas for forming one transmitting antenna ANT1 and two receiving antenna ANT2 and ANT3 without being provided on the RF circuit side. According to the present embodiment, calibration having taken into consideration even the influence of signal transmission lines COX1 and COX2 for connecting the surface of each antenna and the RF circuit can be performed and higher-accuracy calibration can be carried out.

Figure 14:
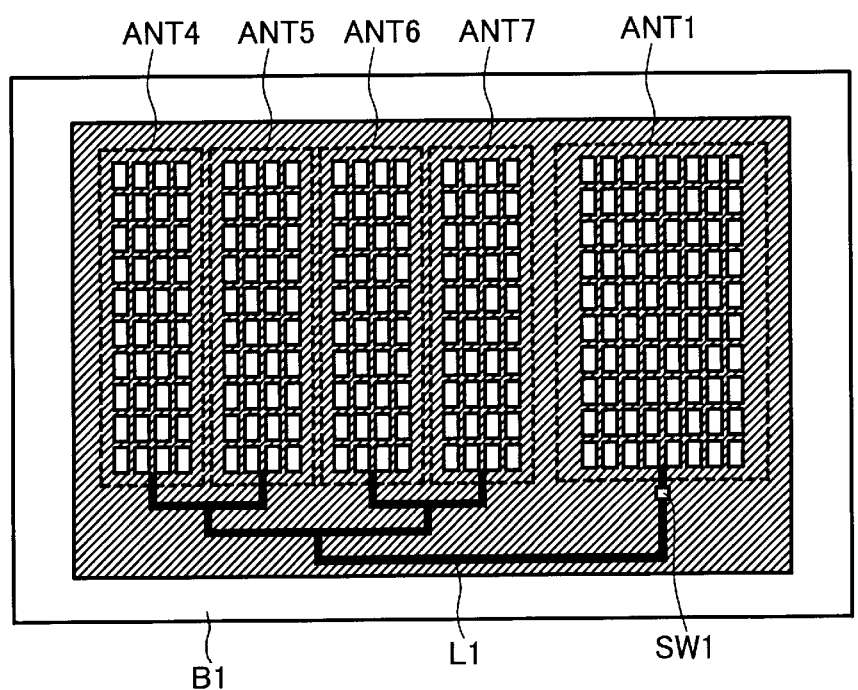
FIG. 14 is a plan view of an antenna section of a further embodiment of the in-vehicle radar module which constitutes the monopulse radar system according to the present invention.

FIG. 14 is a plan view showing another embodiment of the part formed with the antennas. The present embodiment is a monopulse radar having four receiving antennas. In the present embodiment, transmitting/receiving antennas are made up of plane patch antennas. A transmitting antenna ANT1, four receiving antennas ANT4, ANT5, ANT6 and ANT7 arranged in parallel, and a signal transmission line L1 for calibration are respectively supplied with a calibration signal intended for the four receiving antennas ANT4, ANT5, ANT6 and ANT7 via a switch SW1 in equiphase form and at equal power. Even if the number of channels increases where the present embodiment is used, an angular correction can be made by means similar to the above, and an effect similar to the case where the two channels are used, can be obtained.

Figure 15:
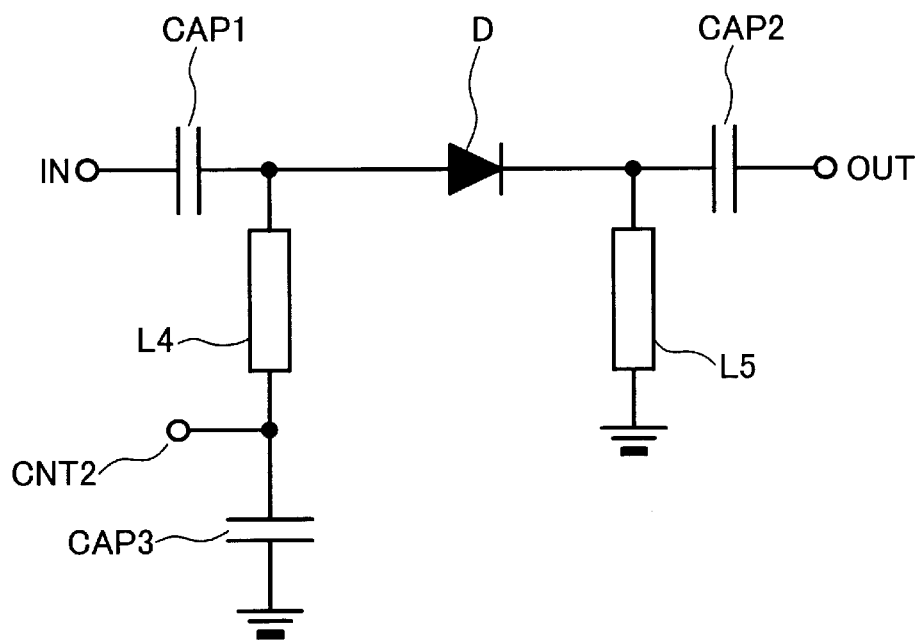
FIG. 15 is a circuit diagram showing a configuration example of a switch used in a monopulse radar system according to the present invention.
Figure 16:
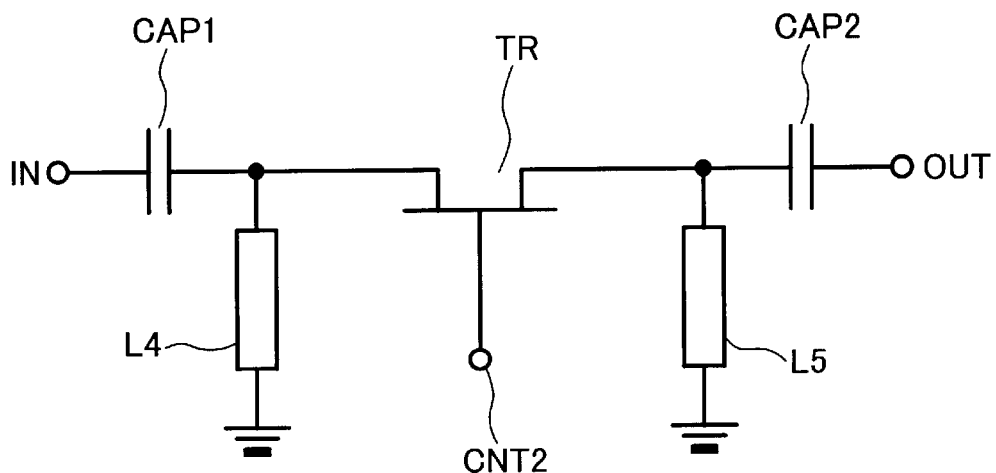
FIG. 16 is a circuit diagram illustrating another configuration example of a switch used in a monopulse radar system according to the present invention.

FIG. 15 is a circuit diagram showing one embodiment of the switch SW1. The switch SW1 is an MMIC formed according to a process similar to other MMIC. A switching diode D is electrically series-connected between an input IN and an output OUT via DC cut capacitances CAP1 and CAP2. Both ends of the switching diode D are supplied with a bias through transmission lines L4 and L5 and a DC cut capacitance CAP3. A control signal terminal CNT2 is provided between the transmission line L4 and the DC cut capacitance CAP3. Each of the DC cut capacitances CAP1, CAP2 and CAP3 has a large capacitance value assumed to be short-circuited for 77 GHz. The bias supply transmission lines L4 and L5 are transmission lines whose leading ends are short-circuited, and respectively have lengths each equal to one-fourth a signal wave length of 77 GHz. Thus, such a bias circuit serves as high impedance in 77 GHz and has no effect on the signal of 77 GHz. A signal for bringing the switch into conduction/cut-off is supplied from the control signal terminal CNT2. Although the diode D is used for the switching device in the present example, a transistor TR such as an FET may be used as shown in FIG. 16. In this case, a control signal terminal CNT2 serves as the gate of the FET.

According to the present invention as described above, the angle correction of the monopulse radar can be easily carried out and its correction can also be automatically performed. The present monopulse radar can therefore cope even with variations in characteristic after product shipment due to environmental variations and time variations in parts characteristic. Further, the accuracy of an angle detected by a monopulse radar system can be maintained. [Description of Reference Numerals and Signs] ANT1: transmitting antenna, ANT2–ANT7: receiving antennas MIX1–MIX6: mixers, OSC1, OSC2: signal oscillators LNA1, LNA2: low noise amlifers, SW1: switch L1: signal transmission line for calibration, L2: bias supply transmission line, P1: signal processing means, CNT1: control signal generating means, CNT2: control signal terminal, PS1: variable phase shifter, VGA1: variable gain amplifier, S1, S2: receive signal patterns of monopulse antennas, S3, S4: receive signal patterns where error is developed between channels, R1: ratio between sum signal and difference signal, MEM1: memory means, RFC: RF circuit, R2: ratio between sum signal and difference signal where error is developed between channels, ANT: plane antenna, B1: base plate, COX1, COX2: coaxial transmission lines, COV1: cover, SUB1: high-frequency circuit substrate, D: diode, CAP: DC cut capacitance, TR: FET, S3 and S4: receive signal patterns where error is developed between channels, R1: ratio between sum signal and difference signal where error R2: ratio between sum signal and difference signal where error is developed between channels.

What is claimed is:

1. A monopulse radar system for radiating a transmit signal from a transmitting antenna and for receiving a signal obtained by allowing the transmit signal to be reflected by a target with two or more receiving antennas to thereby detect the target, comprising:

a plurality of signal transmission lines connected to two or more receiving antennas;

a calibration signal transmission line for supplying the transmit signal to each of the signal transmission lines connected to the two or more receiving antennas as a calibration signal; and signal processing means for adjusting an azimuth angle of a pseudo target calculated based on the calibration signal, so as to reach a predetermined angle of the monopulse radar, wherein said signal processing means calculates the pseudo target and calculates the azimuth angle of the pseudo target when supplied with the transmit signal as the calibration signal through the calibration signal transmission line.

2. The monopulse radar system according to claim 1, further including a switch for bringing the calibration signal transmission line into a conducting state or a cutoff state.

3. The monopulse radar system according to claim 2, further including switch driving means for producing the conducting state of said switch on a regular basis or with predetermined timing.

4. The monopulse radar system according to claim 3, further including modulation means for modulating the calibration signal with a low frequency signal.

5. The monopulse radar system according to claim 4, wherein said signal processing means is provided in correspondence with a channel for effecting signal processing on at least one receiving antenna, which includes correction means for correcting at least either the phase or amplitude of the calibration signal, and a control signal generating unit for driving the correction means.

6. The monopulse radar system according to claim 4, wherein said signal processing means includes means for bringing the switch into a conducting state, calculating an azimuth angle of a pseudo target, which is detected by the calibration signal, and determining correction data so that the calculated azimuth angle reaches a predetermined angle, memory means for storing the correction data therein, and correction means for effecting an angular correction, based on the correction data stored in the memory means upon calculation of the azimuth angle of the target.

7. The monopulse radar system according to claim 3, wherein said signal processing means is provided in correspondence with a channel for effecting signal processing on at least one receiving antenna, which includes correction means for correcting at least either the phase or amplitude of the calibration signal, and a control signal generating unit for driving the correction means.

8. The monopulse radar system according to claim 3, wherein said signal processing means includes means for bringing the switch into a conducting state, calculating an azimuth angle of a pseudo target, which is detected by the calibration signal, and determining correction data so that the calculated azimuth angle reaches a predetermined angle, memory means for storing the correction data therein, and correction means for effecting an angular correction, based on the correction data stored in the memory means upon calculation of the azimuth angle of the target.

9. The monopulse radar system according to claim 3, wherein the calibration signal is supplied to output parts of the two or more receiving antenna at equal power and in equiphase fashion.

10. The monopulse radar system according to claim 2, further including modulation means for modulating the calibration signal with a low frequency signal.

11. The monopulse radar system according to claim 10, wherein said signal processing means is provided in correspondence with a channel for effecting signal processing on at least one receiving antenna, which includes correction means for correcting at least either the phase or amplitude of the calibration signal, and a control signal generating unit for driving the correction means.

12. The monopulse radar system according to claim 10, wherein said signal processing means includes means for bringing the switch into a conducting state, calculating an azimuth angle of a pseudo target, which is detected by the calibration signal, and determining correction data so that the calculated azimuth angle reaches a predetermined angle, memory means for storing the correction data therein, and correction means for effecting an angular correction, based on the correction data stored in the memory means upon calculation of the azimuth angle of the target.

13. The monopulse radar system according to claim 2, wherein said signal processing means is provided in correspondence with a channel for effecting signal processing on at least one receiving antenna, which includes correction means for correcting at least either the phase or amplitude of the calibration signal, and a control signal generating unit for driving the correction means.

14. The monopulse radar system according to claim 2, wherein said signal processing means includes means for bringing the switch into a conducting state, calculating an azimuth angle of a pseudo target, which is detected by the calibration signal, and determining correction data so that the calculated azimuth angle reaches a predetermined angle, memory means for storing the correction data therein, and correction means for effecting an angular correction, based on the correction data stored in the memory means upon calculation of the azimuth angle of the target.

15. The monopulse radar system according to claim 2, wherein the calibration signal is supplied to output parts of the two or more receiving antenna at equal power and in equiphase fashion.

16. The monopulse radar system according to claim 1, further including modulation means for modulating the calibration signal with a low frequency signal.

17. The monopulse radar system according to claim 16, wherein said signal processing means is provided in correspondence with a channel for effecting signal processing on at least one receiving antenna, which includes correction means for correcting at least either the phase or amplitude of the calibration signal, and a control signal generating unit for driving the correction means.

18. The monopulse radar system according to claim 1, wherein said signal processing means is provided in correspondence with a channel for effecting signal processing on at least one receiving antenna, which includes correction means for correcting at least either the phase or amplitude of the calibration signal, and a control signal generating unit for driving the correction means.

19. The monopulse radar system according to claim 1, wherein the calibration signal is supplied to output parts of the two or more receiving antennas at equal power and in equiphase fashion.

20. A monopulse radar system for radiating a transmit signal from a transmitting antenna, and for receiving a signal obtained by allowing the transmit signal to be reflected by a target with two or more receiving antennas to thereby detect the target, comprising:

a signal transmission line connected to a transmitting antenna;

a plurality of signal transmission lines connected to two or more receiving antennas;

a calibration signal transmission line for connecting the signal transmission line connected to the transmitting antenna and the plurality of signal transmission lines connected to the two or more receiving antennas; and a switch for bringing the calibration signal transmission line into conduction or cutoff.

\* \* \* \* \*